No. 831,613. PATENTED SEPT. 25, 1906.
E. C. JONES.
ONION PICKER.
APPLICATION FILED NOV. 21, 1905.

2 SHEETS—SHEET 1.

Witnesses:
Chas. E. Gorton
M. A. Nyman

Inventor:
Edmund C. Jones
By Chas. E. Tillman
Atty.

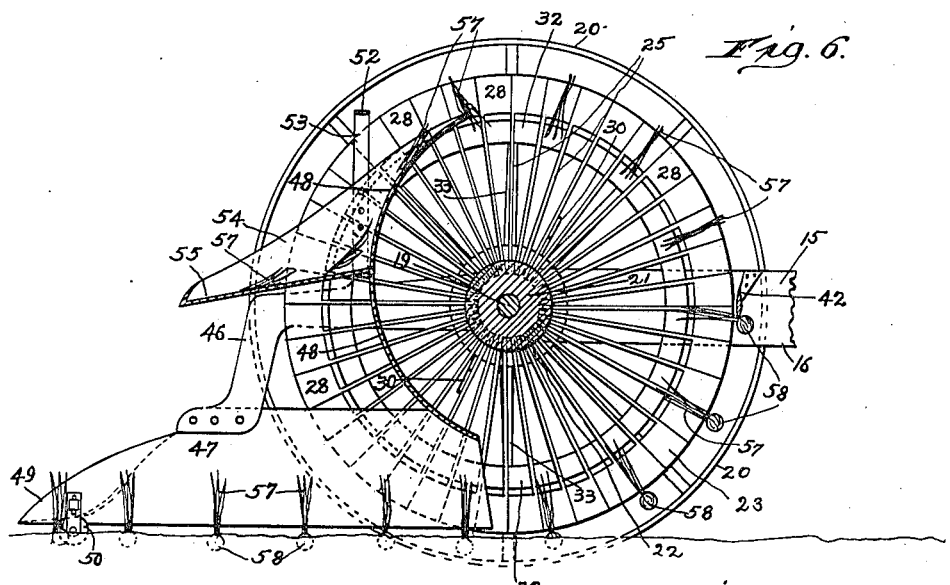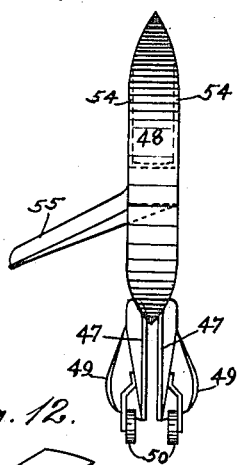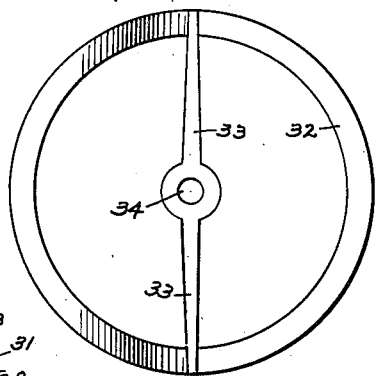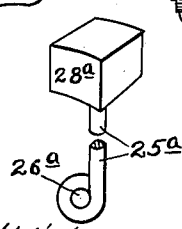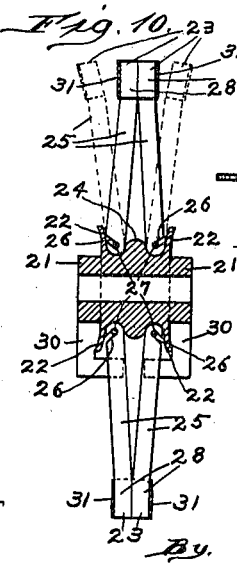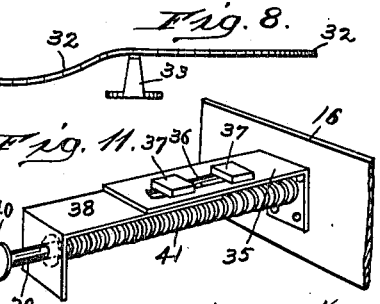

UNITED STATES PATENT OFFICE.

EDMUND C. JONES, OF HARVEY, ILLINOIS.

ONION-PICKER.

No. 831,613.  Specification of Letters Patent.  Patented Sept. 25, 1906.

Application filed November 21, 1905. Serial No. 288,340.

*To all whom it may concern:*

Be it known that I, EDMUND C. JONES, a citizen of the United States, residing at Harvey, in the county of Cook and State of Illinois, have invented certain new and useful Improvements in Onion-Pickers, of which the following is a specification.

This invention relates to certain new and useful improvements in an implement which is primarily intended to be used for picking or gathering onions, yet may be employed for gathering other vegetables of like growth; and it consists in certain peculiarities of the construction, novel arrangement, and operation of the various parts thereof, as will be hereinafter more fully set forth and specifically claimed.

The principal object of the invention is to provide a wheeled implement for gathering or removing onions and the like from the ground which shall be simple and inexpensive in construction, strong, durable, and effective in operation, and which shall be so made that the tops of the onions or other vegetables of a like growth may be severed from the bulbs or bodies by the same operation that removes them from the ground.

Another object of the invention is to provide means for removing dirt from the bulbs as they are carried up by the flexible clamping-wheels of the machine to the cutter by means of which the tops are severed from the bulbs, after which the latter may be deposited in a basket or receptacle or upon the ground.

A still further object is to so construct the picker that the tops of the vegetables after being severed from the bodies or bulbs will be carried to one side of the picker and deposited on the ground out of the way.

Numerous other objects and advantages of the invention will be disclosed in the subjoined description and explanation.

In order to enable others skilled in the art to which my invention pertains to make and use the same, I will now proceed to describe it, referring to the accompanying drawings, in which—

Figure 1:
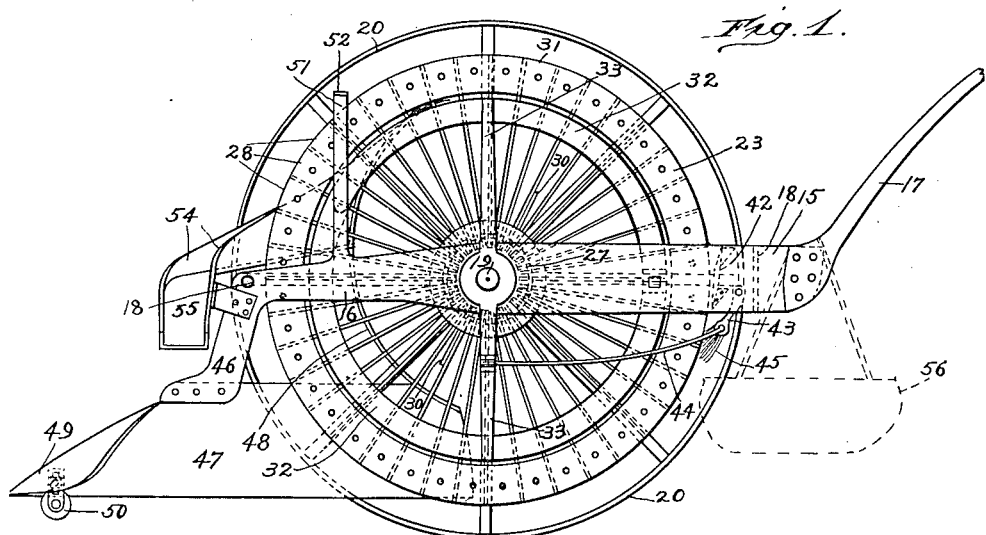
Figure 2:
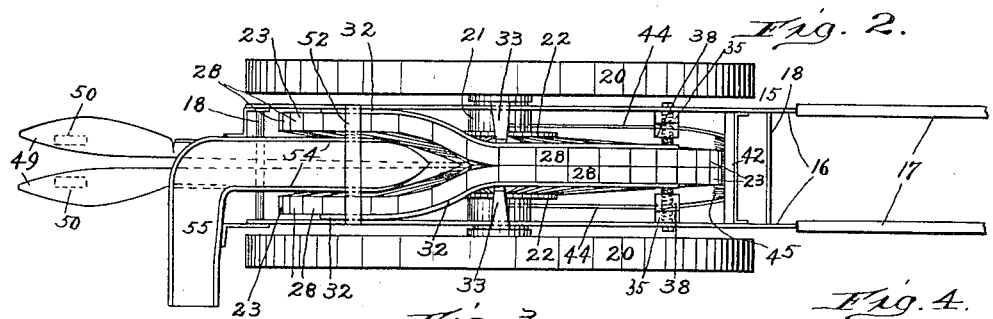
Figures 3, 4, 5:
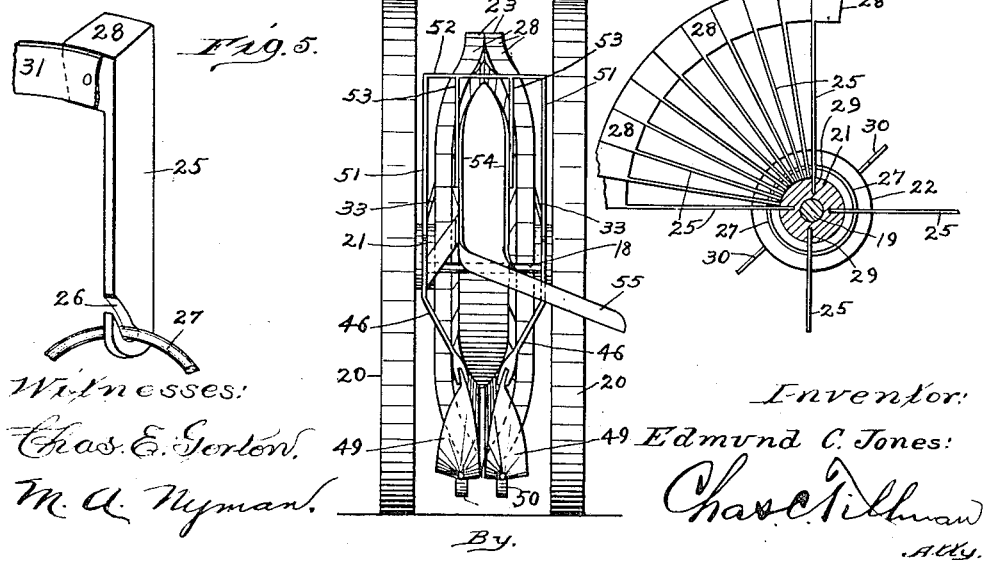

Figure 1 is a view in side elevation of an onion-picker embodying my invention with one of the traction-wheels removed. Fig. 2 is a plan view thereof. Fig. 3 is a front end view. Fig. 4 is a view, partly in section and partly in elevation, of a portion of one of the flexible clamping-wheels and the hub and axle on which it is mounted. Fig. 5 is a detached perspective view of one of the spokes of one of the clamping-wheels, showing the means for connecting said spokes together at their upper and lower ends. Fig. 6 is a central longitudinal sectional view through the picker, showing a portion of the main frame broken away and illustrating the device in the act of picking onions. Fig. 7 is a detached face view of one of the cam-bands which coact with the spokes of the clamping-wheels to cause them to grip or clamp the onion-tops. Fig. 8 is a plan view thereof. Fig. 9 is a rear view in elevation of the guide-runners and chute for the tops of the onions. Fig. 10 is a central vertical sectional view through the clamping-wheels, taken longitudinally through the hub thereof. Fig. 11 is a detached perspective view of a portion of the main frame, showing means for adjusting the pressure of the cam-bands against the clamping-wheels; and Fig. 12 is a perspective view of one of the spokes of the clamping-wheels, showing a modification in its construction and illustrating it shortened or broken.

Like numerals of reference refer to corresponding parts throughout the different views of the drawings.

The reference-numeral 15 designates the main or supporting frame, which consists of two parallel bars or pieces 16, having at their rear ends upwardly and rearwardly extending handles 17, which will afford a convenient means for pushing or propelling the machine; but it will be understood that it may be propelled by being drawn. The bars 16 are secured together near their front and rear ends by means of cross bars or rods 18 and have openings near their middle portions for the reception and operation of an axle 19 on which the traction-wheels 20 are mounted, one of which is located on each side of the main frame and, by preference, outwardly therefrom.

Rigidly mounted on the axle 19 between the bars 16 of the main frame is a hub 21, which has two annular flanges 22, spaced apart to receive between them the inner ends of the spokes comprising the clamping-wheels 23, two of which are employed to coact with one another. The hub 21 is also provided on its outer surface between the flanges 22 with an annular rib 24, which will serve to hold the lower ends of the spokes of the clamping-wheels in position and a slight distance apart circumferentially. Each of the clamping-wheels 23 consists of a series of spokes 25, each of which has in its lower or inner portion a slot 26 to receive a securing-ring 27 and is provided on its outer end with a head or enlargement 28, which when the spokes are in position on the hub 21 will fill the intervening spaces between their outer ends, thus providing broken yet continuous fellies for the clamping-wheels. Some of the spokes of each of the clamping-wheels are somewhat longer than the others thereof, so as to project into recesses 29, arranged radially in the hub 21, thus preventing circumferential movement of the inner ends of the spokes and acting as drives for the clamping-wheels. As a further means to prevent such movement thereof and to propel the wheels the hub 21 is provided with one or more radial wings 30, as is clearly shown in Figs. 1, 4, 6, and 10 of the drawings.

Secured to the outer surfaces of the heads 28 of each of the spokes 25 is a circular strip or band 31, of flexible material, such as strong canvas, which serves to flexibly unite the outer ends of the spokes in such a manner that they may be held in contact with one another yet may have lateral movement, for it will be understood that the inner ends of the spokes, while resting on the hub 21, are not rigidly secured thereto, but will have a pivotal movement on the securing-ring 27, which fits in the slots 26 in the lower ends of the spokes.

Located on the outer surface of each of the clamping-wheels 23 is a cam-faced band 32, each of which is supported on the shaft 19 by means of a diametrically-extending brace 33, which is provided at its middle with an opening 34 to receive said shaft. By reference to Figs. 2, 7, and 8 of the drawings it will be seen and readily understood that the front portion of each of the bands 32 is curved outwardly, thereby widening the space between said portions of the bands, while the rear portions thereof are located in parallelism at a sufficient distance apart to permit the clamping-wheels to pass therebetween when said wheels are pressed together. Secured on the inner rear portion of each of the bars 16 of the main frame and extending horizontally therefrom is a bracket 35, which is provided with a longitudinal slot 36 to receive screw-bolts 37 on an extension-plate 38, which has its outer portion downturned and provided with an opening in which is located a rod 39, having on its outer end a head 40 to impinge against the outer surface of the cam-bands 32. Each of these rods 39 extends longitudinally under the bracket 35 and plate 38 and has surrounding it a spring 41 to press its head against the cam-band, thereby regulating the pressure of the same. Secured at its ends to the rear portion of the bars 16 of the main frame is a knife or cutter 42, which is laterally inclined and is located near the peripheries of the clamping-wheels. Pivotally secured at one of its ends to the main frame, near the knife 42 thereon, is a brush 43, which is connected, by means of rods 44, to the braces 33 of the cam-bands, so that the bristles 45 of the brush will be held close to the peripheries of the clamping-wheels just below the knife 42 or cutter.

The front portions of the bars 16 of the main frame are provided with downturned parts 46, to each of which is secured the front portion of a runner 47, which are spaced apart and extend rearwardly between the front lower portions of the clamping-wheels and have their rear upper portions secured to the lower end of an outwardly-bent guide-plate 48, which is vertically located between the clamping-wheels and has each of its ends tapered, as is clearly shown in Fig. 9 of the drawings, by reference to which figure it will be observed that the rear ends of the runners 47 are contracted to correspond to the taper of the lower end of the plate 48, while their front portions diverge, which is also illustrated in Fig. 2 of the drawings. The front portion of each of the runners 47 is turned over outwardly to form a pointed projection 49, between which the onion or other vegetable tops will pass when the picker is propelled forwardly. Journaled on the lower portion of each of the runners 47 is a roller 50, which is employed to support a part of the weight of the machine and to prevent the projections 49 of the runners plowing too deep into the ground. Extending upwardly from the front portion of each of the bars 16 of the main frame is an upright 51, which are united together at their upper ends by means of a cross-piece 52, from which two parallel bars 53 extend downwardly between the front portions of the clamping-wheels and have their lower ends secured to the sides 54 of a chute 55, the rear end of which is secured to the guide-plate 48 from its upper portion to about its middle, as is clearly shown in Fig. 6 of the drawings. As is clearly shown in Figs. 1 and 2, the chute 55 inclines downwardly and laterally, so as to discharge the onion-tops to one side of the machine. A basket 56 may be suspended on the rear portion of the main frame, so as to hang under the knife or cutter 42 in order to catch the onions or other vegetables after they have been severed from their tops.

From the foregoing and by reference to the drawings it will be readily understood and clearly seen that by propelling the machine forwardly the upper tapered end of the guide-plate 48 and the corresponding end of the chute 55 will cause the spokes 25 of each of the clamping-wheels to be moved outwardly against the outturned portions of the cam-bands, and said guide-plate will hold them at a distance from one another until they have passed the lower tapered end of the plate 48 and the contracted or rear end of the runners, when by reason of the cam-bands they will be pressed together so as to clamp them on the tops 57 of the onions 58, which, as is well known, are planted in rows or drills and grow near the surface of the ground. As the machine is propelled forwardly the pointed ends of the runners 47 will take up the tops 57 of the vegetables, and the runners hold them at a sufficient distance from the ground to enable the spokes of the clamping-wheels to grip or clamp them at the rear ends of the runners, thus carrying the tops and onions upwardly in the revolution of the clamping-wheels until the onions are brought into contact with the bristles 45 of the brush 43, when the same is used, which will remove any dirt clinging thereto, after which the tops will be forced into contact with the knife or cutter 42 and severed from the bulbs, thus permitting them to fall into the basket 56, when the same is used, or upon the ground when the basket is dispensed with.

Instead of forming the spokes of the clamping-wheels of flat bars, as shown in Fig. 5 and above described, I may form them out of wire rods 25$^a$ and provide their lower ends with an eye 26$^a$ by bending the lower portion of the rod into a ring and may place on the upper end of the rod a block 28$^a$, all of which is shown in Fig. 12 of the drawings.

It will be obvious from the above description that the apparatus is susceptible of considerable modification without material departure from the principles and spirit of the invention, and for this reason I do not desire to be understood as limiting myself to the precise form and arrangement of the several parts herein set forth in carrying out my invention in practice.

Having thus fully described my invention, what I claim as new, and desire to secure by Letters Patent, is—

1. The combination with the main frame, of a pair of traction-wheels mounted thereon, a pair of clamping-wheels mounted on the frame side by side between the traction-wheels, means to laterally separate the front portions of the clamping-wheels and to laterally hold together their rear portions, a pair of runners supported on the front portion of the main frame at a distance apart, said runners extending at their rear portions between the lower front portions of the clamping-wheels and projecting forwardly of the main frame at their front portions, substantially as described.

2. The combination with the main frame, of a pair of traction-wheels mounted thereon, a pair of clamping-wheels mounted on the frame side by side between the traction-wheels, means to laterally separate the front portions of the clamping-wheels and to laterally hold together their rear portions, a pair of runners supported on the front portion of the main frame and extending at their rear portions between the lower front portions of the clamping-wheels, and a cutter located transversely on the main frame near the peripheries of the clamping-wheels, substantially as described.

3. The combination with the main frame, of a pair of traction-wheels mounted thereon, a pair of clamping-wheels mounted on the frame side by side between the traction-wheels, means to laterally separate the front portions of the clamping-wheels and to laterally hold together their rear portions, a pair of runners supported on the front portion of the main frame and extending rearwardly between the lower front portions of the clamping-wheels, a cutter located transversely on the main frame near the peripheries of the clamping-wheels, and a brush mounted on the main frame near and below said cutter, substantially as described.

4. The combination with the main frame, of a pair of traction-wheels mounted thereon, a pair of flexible clamping-wheels mounted on the main frame side by side between the traction-wheels, means to laterally separate the front portions of the clamping-wheels and to laterally hold together their rear portions, a pair of runners supported on the front portion of the frame and extending rearwardly between the front lower portions of the clamping-wheels, a chute supported on the upper front portion of the frame, the rear part of said chute extending between the upper front portions of the clamping-wheels, and a cutter located transversely on the main frame near the peripheries of the clamping-wheels, substantially as described.

5. The combination with the main frame, of a pair of traction-wheels mounted thereon, a pair of flexible clamping-wheels mounted on the frame side by side between the traction-wheels, a guide-plate vertically supported between the front portions of the clamping-wheels and having each of its ends tapered, and a cam-band located on the outer surface of each of the clamping-wheels, substantially as described.

6. The combination with the main frame, of a pair of traction-wheels mounted thereon, a pair of flexible clamping-wheels mounted on the frame side by side between the traction-wheels, a guide-plate vertically supported between the front portions of the clamping-wheels and having its ends tapered, a cam-band located on the outside of each of the clamping-wheels, means to press said bands against the clamping-wheels, and a cutter transversely located on the main frame near the peripheries of the clamping-wheels, substantially as described.

7. The combination with the main frame, of a pair of traction-wheels mounted thereon, a pair of flexible clamping-wheels mounted on the frame side by side between the traction-wheels, a guide-plate vertically supported between the front portions of the clamping-wheels and having its ends tapered, a spring-pressed cam-band located on the main frame against the outer surface of each of the clamping-wheels, a cutter transversely located on the main frame near the peripheries of said wheels, a pair of runners supported at a distance apart on the front portion of the frame and having their rear portions extended between the lower front portions of the clamping-wheels and secured to the lower portion of the guide-plate, a chute supported on the front part of the main frame, the rear portion of said chute extending between the upper front portions of the clamping-wheels and secured to the guide-plate and having its front portion extended forwardly of the machine, substantially as described.

8. The combination with the main frame, of a pair of traction-wheels mounted thereon, a pair of clamping-wheels mounted on the frame side by side between the traction-wheels, each of said clamping-wheels consisting of a hub and a series of spokes each having an enlargement on its outer end and its inner end loosely secured to the hub and flexible means connecting the outer ends of the spokes, means to laterally separate the front portions of the clamping-wheels and to laterally hold together their rear portions, substantially as described.

EDMUND C. JONES.

Witnesses:
CHAS. C. TILLMAN,
CHAS. H. DE GRYSE.